Feb. 5, 1946.  H. H. BRUDERLIN  2,394,361
SYNCHRONIZING DEVICE
Filed Sept. 13, 1943  4 Sheets-Sheet 1

INVENTOR.
HENRY H. BRUDERLIN
BY
ATTORNEY

Feb. 5, 1946. H. H. BRUDERLIN 2,394,361
SYNCHRONIZING DEVICE
Filed Sept. 13, 1943 4 Sheets-Sheet 2
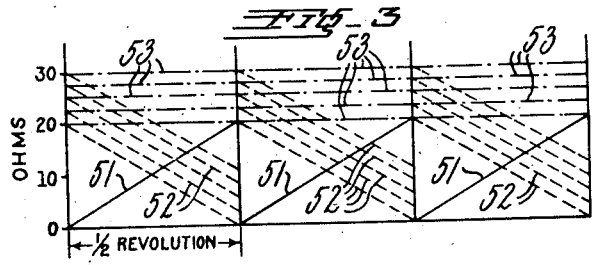
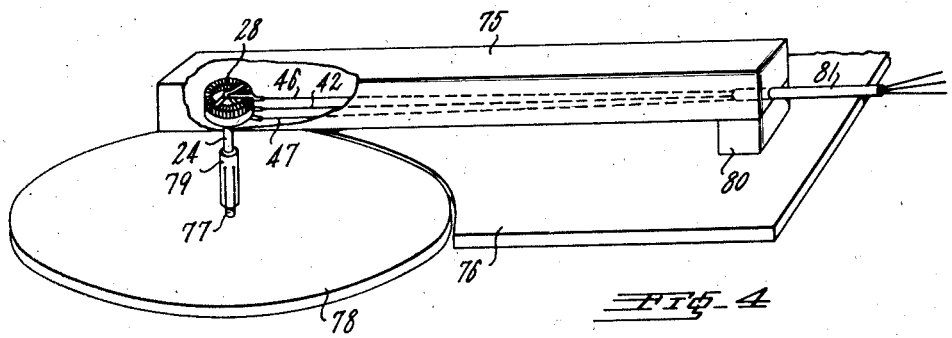
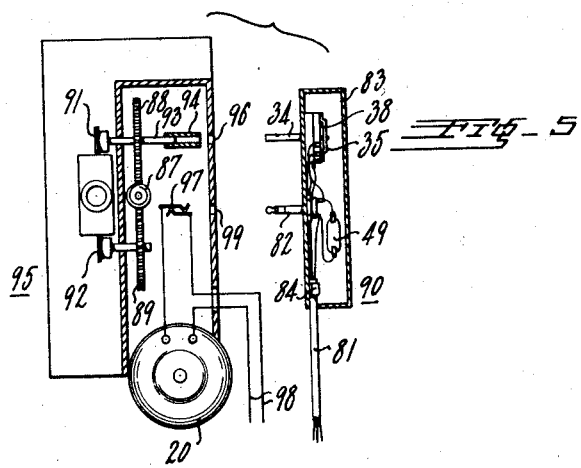
INVENTOR.
HENRY H. BRUDERLIN
BY
ATTORNEY

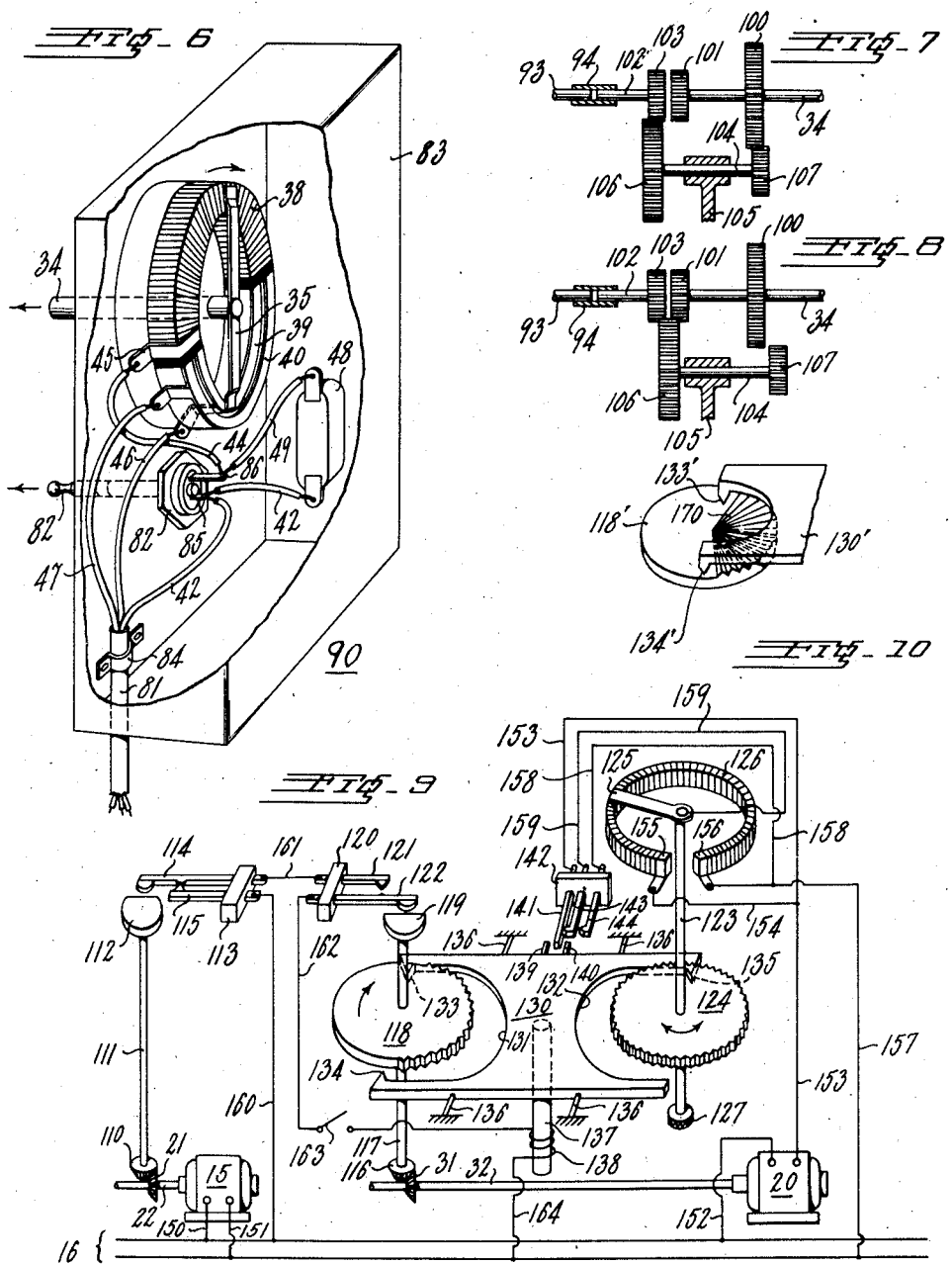

Feb. 5, 1946.   H. H. BRUDERLIN   2,394,361
SYNCHRONIZING DEVICE
Filed Sept. 13, 1943   4 Sheets-Sheet 4

INVENTOR.
HENRY H. BRUDERLIN
BY Richard A. Marsen
ATTORNEY

Patented Feb. 5, 1946

2,394,361

UNITED STATES PATENT OFFICE 2,394,361

SYNCHRONIZING DEVICE

Henry H. Bruderlin, West Los Angeles, Calif.

Application September 13, 1943, Serial No. 502,120

15 Claims. (Cl. 172—293)

This invention relates to synchronizing devices, and more particularly to means for maintaining a constant ratio between the speeds of rotation of a pair of shafts.

While the invention has many applications, it is particularly adapted for the production of home sound movies. Present sound movie equipment, in which the sound track is on the picture film, is relatively expensive, both in the equipment necessary to use the film, and in the original cost and processing of the film itself. Many owners of home movie equipment possess a phonograph, sometimes with recording mechanism included therein. Therefore, a simple device, whereby a phonograph record can be synchronized with a movie camera or with a movie projector, would enable the taking and presenting of sound movies at a relatively low cost.

It is among the objects of this invention to provide a simple, reliable synchronizing device for maintaining a constant ratio between the speeds of rotation of a pair of shafts; to provide a synchronizing device for maintaining a constant ratio between the rotational speeds of a pair of electric motors by varying the impedance included in the power supply circuit of one motor in accordance with changes in speed of such motor relative to the speed of the other or reference motor; to provide means for synchronizing the operation of a movie camera or projector with a phonograph record; to provide means for synchronizing the operation of a motor operated movie camera or projector with a phonograph record by varying the impedance included in the circuit of the camera or projector motor directly with changes in speed of the camera or projector motor relative to the phonograph turntable motor; to provide a synchronizing device for maintaining a constant ratio between the speeds of a pair of shafts by applying a variable braking force to one shaft in accordance with changes in the speed thereof relative to that of the other shaft; and to provide a synchronizing device for a phonograph and a movie camera or projector including a turntable unit and a camera or projector unit which may be quickly attached to and detached from the turntable and camera or projector, respectively.

These and other objects, advantages and features of the invention will be apparent from the following description and accompanying drawings.

In the drawings:

Fig. 3 is a set of curves illustrating the principle of operation of the invention shown in Figs. 1 and 2.

Fig. 4 is a perspective view of a turn-table unit forming a part of mechanism for synchronizing the operation of a motor operated movie camera or projector with a phonograph.

Fig. 5 is an elevation view, partly in section, showing a movie projector and a synchronizer unit adapted to be coupled thereto.

Fig. 6 is an enlarged perspective view of the synchronizer unit shown in Fig. 5.

Figs. 7 and 8 are elevation views, partly in section, of a gear changer which may be incorporated in the synchronizing devices illustrated in Figs. 4 through 6.

Fig. 9 is a schematic wiring diagram illustrating another embodiment of the invention.

Fig. 10 is a perspective view of a modified form of a portion of the apparatus shown in Fig. 9.

Generally speaking, according to the principles of the present invention, the speed of one power driven shaft is maintained at a constant ratio to the speed of another or reference driven shaft, either by varying the power supply of the driving means for the power driven shaft inversely in accordance with the changes in speed of the power driven shaft relative to the speed of the reference shaft, or by controlling the action of a mechanical speed governor in accordance with changes in speed of the power driven shaft relative to the speed of the other or reference shaft. The control is accomplished by mechanisms driven by both shafts and cooperating, upon a change in speed of the power driven shaft relative to that of the reference shaft, either to vary the power supply of the driving means for the power driven shaft, or to control the action of a mechanical governor in such manner as to restore the synchronization between such speeds of operation.

Figure 1:
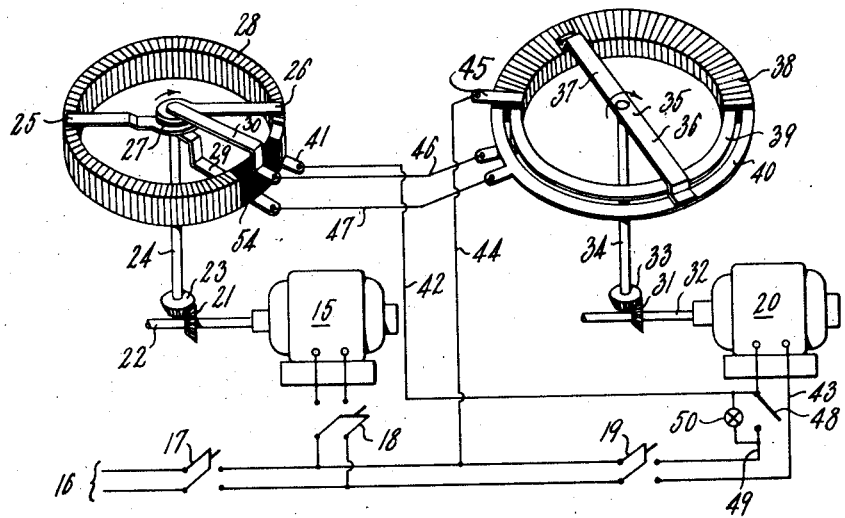
Fig. 1 is a schematic wiring diagram of one embodiment which my invention may assume in practice.

Referring to the embodiment of the invention illustrated in Fig. 1, electric motors 15 and 20 are adapted to be supplied with energizing current from a source of electric current 16 which may be either direct or alternating current. Suitable switches 17, 18 and 19 are provided for connecting one or both motors to the source of current 16.

In accordance with the invention, the speed of a shaft driven by motor 20 is adapted to be maintained at a constant value with respect to the speed of a shaft driven by motor 15, as a reference, by varying the impedance included in the power circuit of motor 20 in direct relation to variations in the speed thereof relative to that of motor 15. For this purpose, a bevel gear 21 is secured to the driven shaft 22 of motor 15 and meshes with a bevel gear 23 on a shaft 24. Shaft 22 may be considered the reference shaft. On the upper end of shaft 24 are a pair of mechanically aligned contact arms 25 and 26 separated by an insulating washer 27. Contact arms 25 and 26 are adapted to be rotated in wiping engagement with a rheostat or adjustable resistance 28. Brushes 29 and 30 are provided in continuous contact with each of the arms 25 and 26, respectively.

Similarly, a bevel gear 31 on the driven shaft 32 of motor 20 meshes with a bevel gear 33 on a shaft 34. A contact arm 35 having a long section 36 and a short section 37 is mounted on the upper end of shaft 34 in wiping engagement with a rheostat 38. Rheostat 38 is semi-annular, and a pair of semi-annular slip rings 39 and 40 complete the wiping circle for the contact arm 35. A terminal 41 of rheostat 28 is connected by a conductor 42 to one terminal of motor 20 and conductor 43 connects the other terminal of the motor to one side of electric source 16.

Another conductor 44 connects the terminal 45 of rheostat 38 to the other side of source 16. The brush 30, which is associated with the contact arm 26, is connected by a conductor 46 to the slip ring 39, and a conductor 47 connects the brush 29 associated with contact arm 25, to the slip ring 40. A switch 48 is provided which may be closed to short circuit or cut out the synchronizing apparatus when it is desired to run motor 20 directly from source 16. One terminal of switch 48 is connected by a conductor 49 to the opposite side of source 16, from that to which the motor is connected by the conductor 43 and the other terminal of switch 48 is connected to conductor 42. An indicating neon lamp 50 may be connected across the conductors 42 and 49 for a purpose to be described hereinafter.

The operation of the embodiment shown in Fig. 1 is as follows. Shafts 24 and 34 are both rotated in the same direction, which in the illustrated embodiment is clockwise. When switches 17, 18 and 19 are closed and switch 48 is open, motors 15 and 20 will be energized from source 16, and both resistances 28 and 38 will be included in the circuit of motor 20. Due to rotation of its arms 25, 26 the amount of resistance 28 included in the motor circuit constantly decreases from a maximum to a minimum during each half revolution of shaft 24. Similarly, the amount of resistance 38 included in the motor circuit increases from a minimum to zero during each half revolution of shaft 34.

To bring the two shafts into synchronism from a fixed indexed position, motor 15 is energized through switches 17 and 18 to rotate reference shaft 24 until contact arm 26 engages insulated section 54 of rheostat 28. Motor 15 is then disconnected and motor 20 is energized through switches 17 and 19. Motor 20 operates through a cycle of less than half a revolution of shaft 34 until short section 37 of arm 35 engages ring 39. When this occurs, the circuit of motor 20 is broken. Motor 20 stops and neon light 49 lights up. Motor 15 is again energized and motor 20 starts automatically. However, this method is necessary only in starting both units from a fixed predetermined position. For general starting, it is merely necessary to energize both motors. The shafts 24 and 34 will come into synchronism and stay there.

When either section 36 or 37 of arm 35 leaves its slip ring 40 or 39, the arm 26 or 25 connected to such slip ring is switched out of the circuit of motor 20. The other arm 25 or 26 cuts in the maximum predetermined amount of resistance 28. At the same time, such section 36 or 37 cuts in a progressively increasing amount of resistance 38.

As the amount of resistance 28 included in the circuit of motor 20 continually decreases during each half revolution of shaft 24, while the amount of resistance 38 included in the motor circuit continually increases during each half revolution of shaft 34, the total resistance included in the motor circuit will remain constant as long as shafts 24 and 34 bear the same phase relationship. This will be apparent from a consideration of Fig. 3, wherein the solid line 51 represents the value of resistance 38 included in the motor circuit, the dash lines 52 represent the values of resistance or rheostat 28 included in the motor circuit, and the dot and dash lines 53 represent the sums of these two resistances or the total resistance included in the motor circuit.

If the speed of shaft 34 increases relative to that of shaft 24, contact arm 35 will then be relatively displaced clockwise with respect to arms 25 and 26. This displacement will increase the instantaneous value of resistance 38 included in the circuit of motor 20. The increased resistance will slow down motor 20 until such time as shafts 24 and 34 assume their predetermined phase relation. Thus, an increase in the speed of shaft 34 relative to shaft 24 increases the amount of impedance in the circuit of motor 20 in direct relation to the increase in speed.

Similarly, if the speed of shaft 34 decreases relative to that of shaft 24 arm 35 will be relatively displaced counter-clockwise with respect to arms 25 and 26, thus decreasing the amount of impedance included in the circuit of motor 20. The decreased impedance in the circuit of motor 20 will cause motor 20 to increase in speed until such time as shafts 24 and 34 have regained their predetermined phase relation. Thus, any change in speed of shaft 34 relative to that of reference shaft 24 causes a corresponding change in the value of the impedance included in the circuit of motor 20, thereby restoring the predetermined constant ratio between the speeds of shafts 24 and 34.

Figure 2:
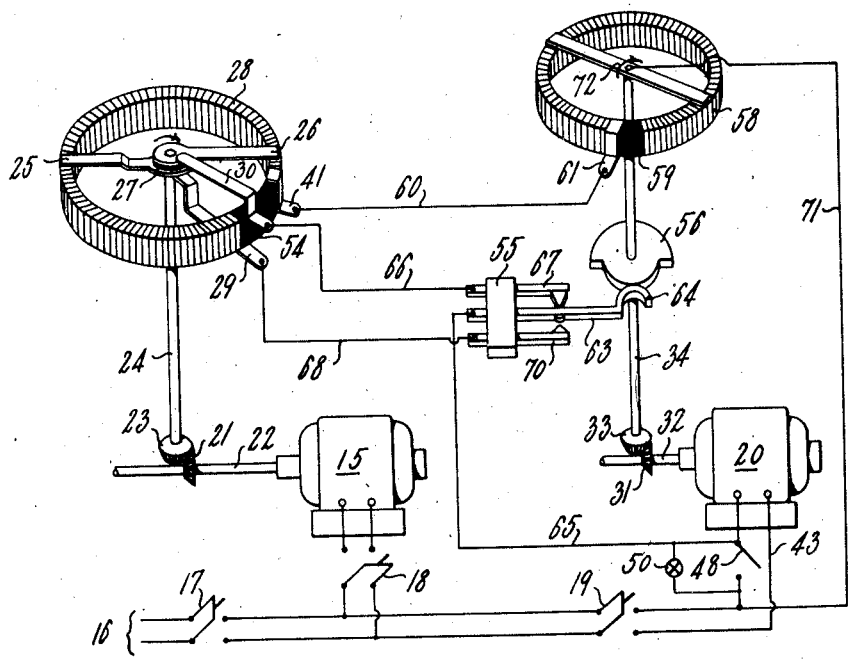
Fig. 2 is a schematic wiring diagram of a modification of the embodiment of the invention illustrated in Fig. 1.

In the arrangement shown in Fig. 2, a cam switch 55 operated by a cam 56 on shaft 34 replaces slip rings 39 and 40 of Fig. 1. In this embodiment rheostat 58, which corresponds to rheostat 38 of Fig. 1, may be made substantially continuous except for a short insulating section 59. Furthermore, a slightly different arrangement of circuit connections is necessary in order to insure proper functioning thereof. A conductor 60 connects terminal 41 of rheostat 28 to terminal 61 of rheostat 58. The central contact arm 63 of switch 55, which contact arm has a portion 64 engaging cam 56, is connected by a conductor 65 to one terminal of motor 20.

The other connections of motor 20 are the same as in Fig. 1. Another conductor 66 connects brush 30 to a contact arm 67 of switch 55, and a conductor 68 connects brush 29 to the third contact arm 70 of switch 55. The arrangement of switch 55 is such that its contact arm 63 is operable by cam 56 to alternately connect arms 25 and 26 of rheostat 28 in circuit after each half revolution of shaft 34. A conductor 71 connects contact arm 72 of rheostat 68 to the opposite side of electric source 16 from that to which conductor 43 is attached.

The operation of the device shown in Fig. 2 is substantially the same as that shown in Fig. 1, and is initiated in the same manner. Due to the rotation of shaft 24, the amount of resistance 28 included in the circuit of motor 20 constantly decreases during each half cycle of rotation of shaft 24, and the amount of rheostat or resistance 58 included in the motor circuit constantly increases during each half revolution of shaft 34. In operation, and with arms 25, 26 and arm 72 in correct phase alignment, each time one end of arm 72 passes terminal 61 of rheostat 58, a different one of arms 25 and 26 is included in the circuit of motor 20. Thus, with the amount of rheostat 28 included in the circuit of motor 20 continuously decreasing in value and that of rheostat 58 continuously increasing in value, during each half revolution of shafts 24 and 34 respectively, the total resistance included in the circuit of motor 20 will be maintained substantially constant. If shaft 34 changes in speed relative to the speed of shaft 24, the phase relation of arms 25, 26 and arm 72 will change correspondingly causing a change in the amount of resistance included in the circuit of motor 20, which change is in a direction and of an amount dependent upon the change in speed of shaft 34 relative to that of shaft 24. Hence, as explained in connection with Fig. 1, the speed of motor 20 is altered until shafts 24 and 34 have reattained their predetermined phase alignment.

It should be noted that, in both Figs. 1 and 2, rheostat 28 should extend through as much of a complete circle as is practically possible to provide for variations in the total resistance in the circuit of motor 20. In Fig. 2, half of rheostat 58 could be eliminated without affecting the synchronizing system. The reason for this is that such half of rheostat 58 is not effectively included in the motor circuit and has no operational effect on motor 20.

Figs. 4, 5 and 6 illustrate how the principles of the invention may be applied to synchronizing a motor operated movie projector with a phonograph turn-table. The average phonograph turn-table rotates at a speed of 78 R. P. M., although some turn-tables rotate at a speed of 33⅓ R. P. M. On all 8 mm. movie projectors having twelve tooth drive sprockets for the film, and with the film being shown at sixteen frames per second, the film sprocket revolves at 80 R. P. M. As the difference of 2 R. P. M. between the speed of the phonograph turn-table and the speed of the projector sprocket shaft is immaterial for practical results, the projector sprocket shaft may be synchronized with the turn-table to rotate at 78 R. P. M. In the event the turn-table rotates at 33⅓ R. P. M., the projector unit of the synchronizer device may be geared down with a 12:5 reduction gear in a manner shown in Figs. 8 and 9 and described hereinafter.

Fig. 4 illustrates the turn-table unit 75 mounted on a record table 76 and coupled to the shaft 77 of a turn-table 78. Unit 75 may comprise resistor 28 of Figs. 1 and 2 and its associated contact arms, with shaft 24 being coupled to turn-table shaft 77 by any suitable coupling means 79 such as a rubber sleeve or a split clamp arrangement. A weight 80 is provided on the outer end of unit 75 and engages table 76 to prevent rotation of the unit with the turn-table. The several leads 42, 46 and 47 from rheostat 28 are brought out as a cable 81 which is connected to the projector unit.

The projector unit 90 is illustrated in perspective in Fig. 6, and comprises rheostat 38 of Fig. 1, and its associated contact arm 35 and rotating shaft 34, a jack 82 and switch 48 of Figs. 1 or 2, all mounted in a housing 83. Cable 81 is secured to housing 83 by a suitable clamp 84. Conductor 46 is shown secured to slip ring 39; conductor 47, to slip ring 40; and conductor 42, to one terminal 5 of jack 82 and then to one terminal of switch 48. The other terminal of switch 48 is connected by conductor 49 to a second terminal 86 of jack 82 and conductor 44 connects terminal 86 to terminal 45 of rheostat 28. The actual connections between turn-table unit 75 and projector unit 90 are those illustrated in Fig. 1.

Fig. 5 illustrates how unit 90 is associated with a projector 95. The projector motor is illustrated at 20, corresponding to motor 20 of Fig. 1. Through suitable gearing (not shown), motor 20 drives a worm 87 which operates worm gears 88, 89 and film drive gears 91, 92. The projector sprocket shaft 93 is provided with a suitable coupling member 94, and an aperture 96 is provided in the housing of projector 95 in alignment with shaft 93. A normally closed jack switch 97 is inserted in the energizing circuit for motor 20, which motor may be connected by leads 98 to electric source 16. Opposite jack switch 97, an aperture 99 is provided in the housing of projector 95.

Shaft 34 of rheostat 38, and jack 82, both mounted in projector unit 90 are aligned respectively with apertures 96 and 99, as shown in Fig. 5. When unit 90 is inserted in place on projector 95, shaft 34 is coupled with shaft 93 through coupling member 94, and jack 82 opens switch 97 and makes contact with the arms thereof so that the projector unit is then included in the circuit of motor 20. The operation of the apparatus shown in Figs. 4, 5 and 6 is the same as that described in connection with Fig. 1.

Figs. 7 and 8 illustrate a reduction gearing arrangement which may be used in the event the turn-table speed is 33⅓ R. P. M. As shown, shaft 34 of rheostat 38 has mounted thereon a large gear 100 and a small gear 101. A second shaft 102 provided with a gear 103 is aligned with shaft 34. Shaft 102 is adapted to be coupled with projector sprocket shaft 93. The remainder of the gear change unit comprises a counter shaft 104 which is slidably mounted in a bearing 105 and has on one end thereof a large gear 106 adapted to mesh selectively with one or both gears 103 and 101. On the opposite end of counter shaft 104 is a small gear 107 adapted to selectively mesh with gear 100.

For a turn-table rotated at 33⅓ R. P. M., the gear change unit is in the position illustrated in Fig. 7 in which projector shaft 93 through coupling 94 drives shaft 102. Shaft 34 is then driven through gear 103, gear 106, gear 107 and gear 100. The relative number of teeth on gears 103, 106, 107 and 100 is so chosen that a 12:5 reduction in the speed of shaft 34 relative to that of shaft 102 or the projector drive sprocket shaft 93, is attained through the gearing. For a turn-table rotated at 78 R. P. M., counter shaft 104 is moved to the right as shown in Fig. 8. In this position, gear 106 engages both gears 103 and 101, and gear 107 is out of engagement with gear 109. Shaft 34 of rheostat 38 is therefore driven directly from shaft 102 and the projector drive sprocket shaft 93. In the event the film drive gear has more or less than twelve teeth, the gear ratio of the unit shown in Figs. 7 and 8 will be chosen to provide the proper speed ratio between the two units of the synchronizer device.

Fig. 9 illustrates another embodiment of the invention in which the synchronizing operation is intermittent rather than continuous as in the embodiments previously described. In this latter embodiment, bevel gear 21 on shaft 22 of motor 15 engages a bevel gear 110 on a shaft 111. On the upper end of shaft 111 is a cam 112 which is operatively associated with a switch 113. Switch 113 includes a contact arm 114 adapted to engage cam 112, and a contact arm 115. Cam 112 is so designed that contacts 114 and 115 remain closed during only a minor portion of each revolution, and are held open by the cam during the remainder of each revolution.

Bevel gear 31 on shaft 32 of motor 20 engages a bevel gear 116 on shaft 117. On the upper end of shaft 117 is a gear 118 from which a little more than half of the teeth have been removed. Adjacent gear 118 on shaft 117 is a cam 119 operatively associated with a switch 120, including contact arms 121 and 122. Contact arms 121, 122 normally remain open during a small part of a revolution of shaft 117, and are closed by cam 119 during the remainder of each revolution of the shaft.

Adjacent shaft 117 and parallel therewith is a shaft 123 on which is a gear 124 disposed in the plane of gear 118. On an end of shaft 123 is a contact arm 125 in wiping engagement with a rheostat 126, and on the other end is a manual adjustment knob 127. Knob 127 permits an operator to adjust the speed of motor 20 manually, if desired.

Disposed between gears 118 and 124, and normally outside of the plane of the gears, is an element such as a ratchet carriage or linking mechanism 130. Mechanism 130 is formed with cutaway portions 131 and 132. For a purpose to be described hereinafter, recess 131 terminates in radially inwardly extending teeth 133 and 134, and recess 132 terminates in a similar tooth 135. Linking mechanism 130 is supported on flexible wires 135, 136 which are secured to a suitable support. The support of the mechanism 130 on wires 135, 136 permits it to be displaced both laterally toward either of gears 118 or 124, and also vertically into the plane of these gears. The vertical displacement is accomplished by a solenoid plunger 137 operable by a solenoid winding 138. Adjacent its inner end, the mechanism 130 is provided with a pair of projections or pins 139 and 140 between which extends operating arm 141 of a switch 142. Switch 142 includes a contact arm 143 normally engaging arm 141, and a contact arm 144 normally separated from contact arm 143.

Motor 15 is connected to the source of electric current 16 by conductors 150, 151. A conductor 152 connects one terminal of motor 20 to one side of source 16, and the other terminal of the motor is connected through a conductor 153 to contact arm 141 of switch 142. A branch conductor 153 connects conductor 153 to terminal 155 of rheostat 126. The other terminal 156 of rheostat 126 is connected by a conductor 157 to the opposite side of source 16. A branch conductor 158 connects terminal 156 to contact arm 144 of switch 142, and contact arm 143 of switch 142 is connected through conductor 159 to contact arm 125 of rheostat 126.

The circuit for solenoid winding 138 includes switches 113 and 120. For this purpose, a conductor 160 connects one side of source 16 to contact arm 115 of switch 113, and conductor 161 connects contact arm 114 to contact arm 121 of switch 120. Contact arm 122 of switch 120 is connected by a conductor 162 through a switch 163 to one side of solenoid winding 138, and a conductor 164 connects the other side of winding 138 to the opposite side of source 16. Switch 163 in conductor 162 is used to disconnect the synchronizing mechanism.

The synchronizing apparatus shown in Fig. 9 operates as follows. Cam 112 is so designed that contacts 114 and 115 will be closed during only a small part of each revolution of shaft 111 over an angle of approximately 20 to 40 degrees, and will be open during the remainder of the revolution. The unit including cam 112 and switch 113 will thus give one impulse per revolution of shaft 111. Cam 119 is so designed that switch 120 is open during a small part of each revolution of shaft 117 over an angle of approximately 40 to 60 degrees, and closed during the remainder of the revolution. It will be noted that solenoid winding 138 is in series with switches 113 and 120, so that, when either of these switches is open, nothing happens. This is the case when the shafts 111 and 117 are synchronized. When both switches 113 and 120 are closed at the same time, winding 138 will be energized to move plunger 137 against carriage 130, to move it into the plane of gears 118 and 124.

Should shaft 117 run a little ahead of shaft 111, cam 119 will have turned to such position that it will close contacts 121, 122 before cam 112 opens the contacts 114, 115. Under such circumstance, solenoid winding 138 will be energized, and plunger 137 will move carriage 130 into the plane of gears 118 and 124. The gear teeth on gear 118 will thereupon engage tooth 134 on carriage 130, pulling the carriage to the left of the position shown in Fig. 9. At the same time, tooth 135 will have engaged gear 124 and this gear will be rotated in a counter-clockwise direction to move arm 125, increasing the amount of resistance 126 included in the circuit of motor 20, thus slowing the average speed of this motor. If on the other hand, shaft 117 runs a little behind shaft 111, tooth 133 of carriage 130 will engage the gear teeth on gear 118, forcing the carriage to the right and thus rotating gear 124 and contact arm 125 in a clockwise direction to decrease the amount of resistance 126 included in the circuit of motor 20.

When the circuit of solenoid winding 138 is broken at either switch 113 or 120, solenoid winding 138 is de-energized, and carriage 130 returns to the position shown in Fig. 9. Since the length of time carriage 130 is engaged with gears 118 and 124 is the same as the length of time that switches 113 and 120 are both closed, gear 124 will be rotated only slightly, if shafts 111 and 117 are only a small amount out of phase, and will be rotated considerably if they are a considerable amount out of phase. Cam 112 is preferably made to close switch 113 for a shorter time than cam 119 is made to open switch 120, so that only a slight amount of phase difference between shafts 111 and 117 will not cause the synchronizing device to operate. This is the operating tolerance, and is necessary to avoid causing the device to hunt or operate continuously back and forth.

In case shaft 117 is out of phase with and rotating slightly slower than shaft 111, one actuation of the synchronizing device through energization of coil 138 will increase the average speed of motor 20 so that it will become the same as the average speed of motor 15. On the next revolution of shafts 111 and 117, cams 112 and 119 will still have the same phase angle between them, so that the synchronizer will be actuated again. This second actuation will increase the speed of shaft 117 too much, causing it to overspeed until it reaches the other end of its tolerance, whereupon the synchronizing operation will recur in the reverse direction. To avoid this, the speed of shaft 117 is momentarily slowed down or speeded up at the same time that the average speed is adjusted. Such operation brings the shaft 117 back to the proper phase relation with the shaft 11, at the same time the average speed correction is made. This is accomplished by switch 142. When carriage 130 is forced to the left, increasing the resistance of rheostat 126, projection 140 will force apart contacts 141 and 143. This momentarily places the entire resistance 126 in the circuit of motor 20 for as long as solenoid winding 138 is energized. If the carriage 130 is forced to the right, contacts 143 and 144 are closed by means of projection 139, and the entire resistance 126 is shorted out, thus causing motor 20 to speed up as long as solenoid winding 138 is energized. This operation insures the restoration of the proper phase relation without hunting.

The primary advantage of the apparatus shown in Fig. 9, is that it is actuated only when shaft 111 and shaft 117 get out of phase. This device is useful for synchronizing a movie camera or projector with a phonograph turn-table as are the previously described systems. In such case, shaft 111 would be coupled to the turn-table shaft in the same manner as shaft 24 of the devices of Figs. 1 and 2. Similarly, shaft 117 would be coupled to drive sprocket shaft 93 of the projector unit so that gear 118 would be rotated thereby. In actual practice, the discontinuity in speed of the projector due to operation of the synchronizing device is so minor as to be unnoticeable.

Fig. 10 illustrates a modified form of a portion of the device of Fig. 9. In the arrangement shown in Fig. 10, instead of being formed with a series of gear teeth gear 118' is formed with a series of radial ridges 170. The teeth 133', 134' of the carriage 130' extend at right angles to the plane of the table for movement into engagement with ridges 170. The gear 124 may be formed in a similar manner. The device shown in Fig. 10 is better for practical operation, as it requires less vertical displacement of carriage 130'.

Figure 11:
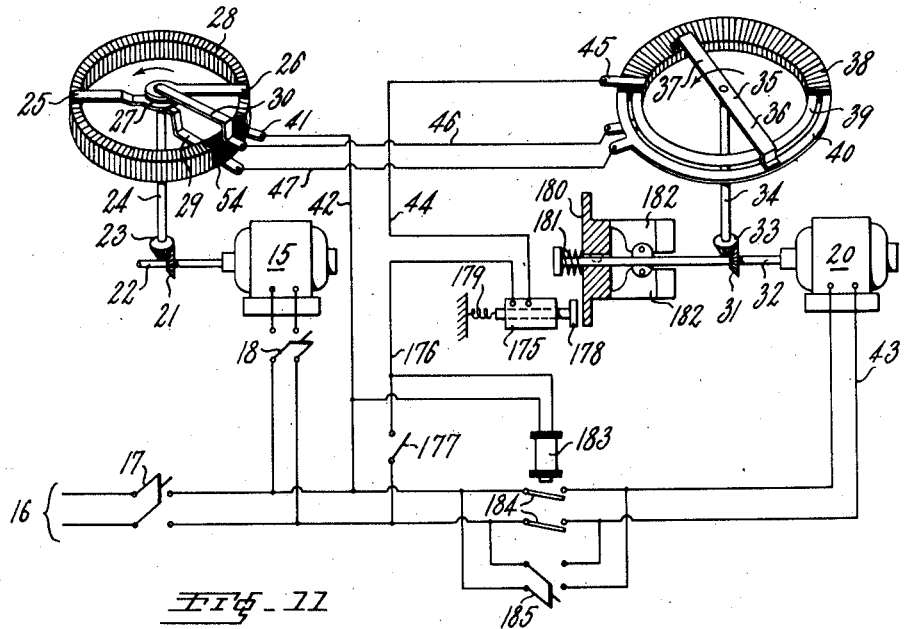
Fig. 11 is a schematic wiring diagram of a modification of the embodiment of the invention shown in Fig. 1.
Figure 12:
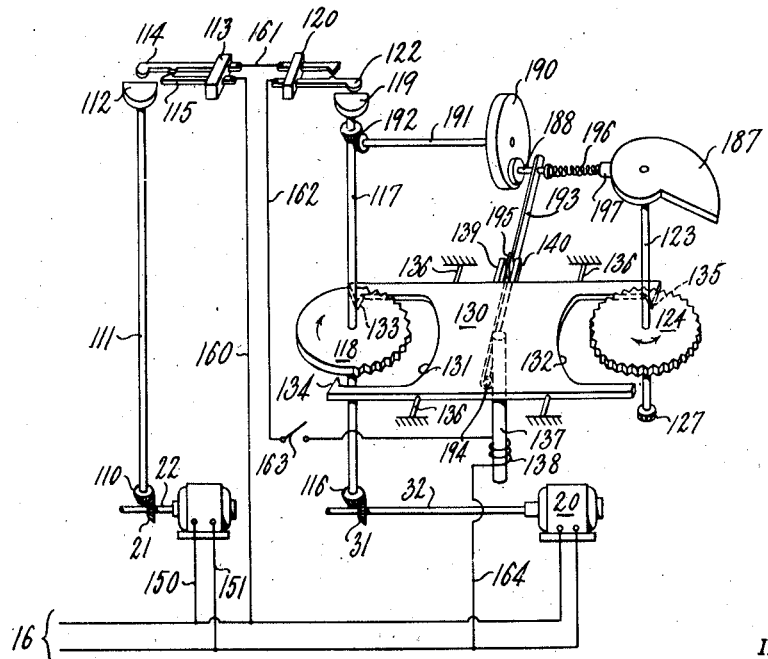
Fig. 12 is a schematic wiring diagram of a modification of the embodiment of the invention illustrated in Fig. 9.

In certain types of projectors, the power supply to the driving motor is maintained constant, and the speed is controlled by means of a mechanical type speed governor. The application of the invention to this type of speed control is illustrated in Figs. 11 and 12. Fig. 11 illustrates the application of the embodiment of the invention schematically illustrated in Fig. 1 to an arrangement where the driven shaft speed is controlled by a mechanical governor. Elements corresponding to those illustrated in Fig. 1 have been given the same reference characters.

In this embodiment of the invention, the rheostats 28 and 38, instead of varying the impedance of the circuit of motor 20, control the energization of a solenoid brake associated with a mechanical governor operated by the driven shaft 32. In contra-distinction to Fig. 1, the arms 25 and 26 of rheostat 28 rotate counter-clockwise in such a direction that the amount of resistance 28 included in the circuit of the solenoid brake constantly increases during each half revolution of shaft 24. Similarly, contact arm 35 of rheostat 38 rotates counter-clockwise to constantly decrease the amount of resistance 38 included in the circuit during each half revolution of shaft 34. Contact arms 25 and 26 are connected, respectively, with slip rings 39 and 40 through conductors 46 and 47. Conductor 42 connects terminal 41 of rheostat 28 to one side of the supply circuit. A conductor 44 connects terminal 45 of rheostat 38 to one terminal of a solenoid brake 175. The other side of solenoid brake 175 is connected by conductor 176 through a switch 177 to the other side of the power supply circuit.

Solenoid brake 175 includes a braking plunger 178 normally urged to the left by a spring 179. Plunger 178 is adapted to cooperate with a disk 180 slidably keyed on shaft 32. A spring 181 normally urges disk 180 toward a pair of centrifugal weights 182, 182 pivoted on shaft 32. When shaft 32 rotates, weights 182 tend to swing out from shaft 32 to urge disk 180 toward the right and into engagement with plunger 178. The position of plunger 178 is controlled by the interaction of rheostats 28 and 38. If shaft 32 rotates faster than shaft 22, the amount of resistance 38 included in the circuit of solenoid brake 175 will decrease faster than the amount of resistance 28 included in the circuit increases. This will cause an increased energization of solenoid brake 175, moving plunger 178 to the right into more forceful engagement with disk 180. Braking action slows down the speed of shaft 32 until such time as the speeds of shafts 22 and 32 are again in synchronism. Similarly, if shaft 32 tends to rotate slower than shaft 22, the amount of resistance included in the circuit of solenoid brake 175 will increase. This will decrease the energization of solenoid brake 175 and spring 179 will move plunger 178 to the left, decreasing the braking force exerted on disk 180 and permitting shaft 32 to speed up.

The motor 20 is connected to the power supply circuit through the medium of a relay 183 having contact arms 184. Upon closure of switch 177 to place the synchronizing system in operation, relay 183 will be energized as it is connected across conductors 42, 176. Contacts 184 will then be moved into a position to close the circuit to motor 20. Energization of motors 20, when the synchronizing system is not in operation, may be effected through the medium of switch 185 connected around the contacts 184.

Fig. 12 illustrates how the system of Fig. 9 may be employed to control the operation of a mechanical type governor. Parts identical with those in Fig. 9 have been given like reference characters. In this embodiment of the invention, the rheostat 126 is replaced by a cam 187 which controls the action of a brake 188 cooperating with a disk 190 on a shaft 191 driven through the medium of gearing 192 from shaft 117. The brake 188 is mounted on a leaf spring 193 secured at 194 beneath the carriage 130. Leaf spring 193 is provided with an upstanding ear 195 coacting with the pins 139 and 140 on carriage 130. Cam 187 controls the position of brake 188 through the medium of compression spring 196 and a bearing shoe 197.

The operation of this embodiment of the invention is as follows. As in Fig. 9, the cams 112 and 119 are so related that the switch 113 is normally closed when the switch 120 is normally open. This is true when shafts 22 and 32 are rotating in synchronism. If the shafts get out of synchronism, solenoid 138 is energized to move plunger 137 and carriage 130 upwardly in the manner previously described. If shaft 32 is moving faster than shaft 22, tooth 134 will engage the teeth of gear 118 to move carriage 130 to the left. Tooth 135 will thereupon rotate gear 124 and cam 187 counter-clockwise, increasing the pressure of brake 188 against disk 190, slowing down shaft 32. At the same time, to insure proper phasing of the shafts, the pin 140 will engage ear 195 to move spring 193 to the left. This momentarily greatly increases the pressure of brake 188 against disk 190 to slow shaft 32 down sufficiently to bring it back into synchronism and proper phase relation with shaft 22. The spring 193 thus provides an anti-hunting arrangement similar to that previously described. Upon a decrease in the speed of shaft 32 relative to that of shaft 22, the pressure of brake shoe 188 against disk 190 is decreased in a manner which will be apparent. Similarly, pin 139 will move spring 193 to the right to momentarily greatly decrease the pressure of brake 188 against disk 190 to effect an anti-hunting action.

While specific embodiments of the invention have been described to illustrate the application of the principles thereof, it will be understood that the invention may be otherwise embodied without departing from the principles thereof.

What is claimed is:

1. A synchronizing system for maintaining a constant ratio between the speeds of rotation of a reference shaft and an electric motor driven shaft comprising a pair of cooperating switching mechanisms each operable by one of the shafts and adjustable impedance means operatively associated with said mechanism and in circuit relation with the power supply of the motor driving the drive shaft, said adjustable impedance means being operable by said mechanisms, and said mechanisms, upon a change in speed of the motor driven shaft relative to the speed of the reference shaft, operating to adjust the value of said adjustable impedance means in a direction to vary the power supply of the motor inversely relative to such change of speed to restore such constant ratio between the speeds of rotation of the shafts.

2. A synchronizing system for maintaining a constant ratio between the speeds of rotation of a reference shaft and an electric motor driven shaft comprising a pair of adjustable impedance means, each including rotatable contact arm means in circuit relation with the motor driving said driven shaft; mechanism operable by one shaft for rotating one of said contact arm means in a direction to continuously decrease the amount of its associated impedance included in such circuit relation during each half revolution of such one contact arm means; and mechanism operable by the other shaft for rotating the other of said contact arm means in a direction to continuously increase the amount of its associated impedance included in such circuit relation during each half revolution of such other contact arm means.

3. A synchronizing system for maintaining a constant ratio between the speeds of rotation of a reference shaft and an electric motor driven shaft comprising: a first adjustable impedance including a pair of aligned, electrically independent rotatable contact arms; a second adjustable impedance including a pair of slip rings and a single rotatable contact arm comprising diametrically aligned sections alternately engageable with said second impedance and one of said slip rings; both of said adjustable impedance means being connected in series circuit relation with the motor driving the driven shaft; means connecting each of said aligned contact arms to one of said slip rings; mechanism operable by one shaft for rotating said aligned contact arms in a direction to decrease continuously the amount of said first adjustable impedance included in such series circuit relation during each half revolution of said contact arms; and mechanism operable by the other shaft for rotating said single contact arm in a direction to increase continuously the amount of said second adjustable impedance included in such series circuit relation during each half revolution of said single contact arm.

4. A synchronizing system for maintaining a constant ratio between the speeds of rotation of a reference shaft and a driven shaft comprising a speed responsive governor operatively associated with said driven shaft; a solenoid actuated brake controlling the action of said governor; a pair of adjustable impedance means, each including rotatable contact arm means in circuit relation with such solenoid; mechanism operable by one shaft for rotating one of said contact arm means in a direction to continuously decrease the amount of its associate impedance included in such circuit relation during each half revolution of said one contact arm means; and mechanism operable by the other shaft for rotating the other of said contact arm means in a direction to continuously increase the amount of its associated impedance included in such circuit relation during each half revolution of such other contact arm means.

5. A synchronizing system for maintaining a constant ratio between the speeds of rotation of a reference shaft and an electric motor driven shaft comprising; a first adjustable impedance including a pair of aligned, electrically independent rotatable contact arms; a second adjustable impedance including a single rotatable contact arm comprising diametrically aligned sections, both of said adjustable impedance means being connected in series circuit relation with the motor driving the driven shaft; a cam rotatable with said single contact arm; a switch having a movable contact operatively associated with said cam and a pair of relatively fixed contacts on either side of said movable contact; means connecting each of said aligned contact arms to one of said relatively fixed contacts; mechanism operable by one shaft for rotating said aligned contact arms in a direction to continuously decrease the amount of said first adjustable impedance included in such series circuit relation during each half revolution of said contact arms; and mechanism operable by the other shaft for rotating said single contact arm and said cam in a direction to increase continuously the amount of said second adjustable impedance included in such series circuit relation during each half revolution of said single contact arm.

6. A synchronizing system for maintaining a constant ratio between the speeds of rotation of a reference shaft and an electric motor driven shaft comprising; a first adjustable impedance including a pair of aligned, electrically independent rotatable contact arms; a second adjustable impedance including a single rotatable contact arm comprising diametrically aligned sections, both of said adjustable impedance means being connected in series circuit relation with the motor driving the driven shaft; a cam rotatable with said single contact arm; a switch having a movable contact operatively associated with said cam and a pair of relatively fixed contacts on either side of said movable contact; means connecting each of said aligned contact arms to one of said relatively fixed contacts; mechanism operable by one shaft for rotating said aligned contact arms in a direction to continuously decrease the amount of said first adjustable impedance included in such series circuit relation during each half revolution of said contact arms; and mechanism operable by the other shaft for rotating said single contact arm and said cam in a direction to increase continuously the amount of said second adjustable impedance included in such series circuit relation during each half revolution of said single contact arm, said cam being operable after each half revolution thereof to engage said movable contact alternately with each of said fixed contacts.

7. A synchronizing system for maintaining a constant ratio between the speeds of rotation of a reference shaft and an electric motor driven shaft comprising a pair of cooperating switching mechanisms each operable by one of the shafts, said switching mechanisms being connected in series circuit relation and one of said switching mechanisms normally being open during the period when the other switching mechanism normally is closed; both of said switching mechanisms being closed upon a change in speed of the driven shaft relative to the speed of the reference shaft; an adjustable impedance connected in series with the motor driving the driven shaft; a first gear means operatively associated with said adjustable impedance; a second gear means operable by the driven shaft; and electrically operable means connected in series with said switching mechanisms and effective to interconnect said first and second gear means to operate said impedance to vary the power supply to the motor inversely relative to such change of speed.

8. A synchronizing system for maintaining a constant ratio between the speeds of rotation of a reference shaft and a driven shaft comprising a pair of switches; a first cam means operable by one shaft and operative to hold one of said switches open during a portion of each revolution of said first cam means; a second cam means operable by the other shaft and operative to hold the other of said switches closed during a portion of each revolution of said second cam means; said switches being connected in series circuit relation and one of said switches normally being open during the period when the other switch normally is closed; both of said switches being closed upon a change in speed of the driven shaft relative to the speed of the reference shaft; a disk operatively associated with said driven shaft; a brake normally engaging said disk; a cam controlling the pressure of said brake against said disk; a first gear means operatively associated with such cam; a second gear means operable by said driven shaft; and solenoid means connected in series with said switches and effective to interconnect said gear means to operate said cam to vary the pressure of said brake against said disk in accordance with such change of speed.

9. A synchronizing system for maintaining a constant ratio between the speeds of rotation of a reference shaft and an electric motor driven shaft comprising a pair of switches; a first cam means operable by one shaft and operative to hold one of said switches open during a portion of each revolution of said first cam means; a second cam means operable by the other shaft and operative to hold the other of said switches closed during a portion of each revolution of said second cam means; said switches being connected in series circuit relation and one of said switches normally being open during the period when the other switch normally is closed; both of said switches being closed upon a change in speed of the driven shaft relative to the speed of the reference shaft; impedance means connected in the circuit of the motor driving the driven shaft; gear means operatively associated with said impedance means; a gear operable by the driven shaft and having teeth over less than half its circumference; an element having a pair of teeth selectively engageable with the teeth on said gear and a tooth selectively engageable with said gear means; and solenoid means connected in series with said switches and effective to engage said element with said gear means and gear to vary the power supply of such motor inversely relative to such change of speed.

10. A synchronizing system for maintaining a constant ratio between the speeds of rotation of a reference shaft and an electric motor driven shaft comprising a pair of switches; a first cam means operable by one shaft and operative to hold one of said switches open during a portion of each revolution of said first cam means; a second cam means operable by the other shaft and operative to hold the other of said switches closed during a portion of each revolution of said second cam means; said switches being connected in series circuit relation and one of said switches normally being open during the period when the other switch normally is closed; both of said switches being closed upon a change in speed of the driven shaft relative to the speed of the reference shaft; impedance means connected in series with the motor driving the driven shaft; a first disk formed with radially extending ridges; a second disk operable by such motor and formed with radially extending ridges over less than half its surface area; an element having a pair of teeth selectively engageable with the ridges on said first disk and a tooth selectively engageable with the ridges on said second disk; and solenoid means connected in series with said switches and effective to engage said element with said disks to operate said impedance to vary the power supply of the motor inversely relative to such change of speed.

11. A synchronizing system for maintaining a constant ratio between the speeds of rotation of a reference shaft and an electric motor driven shaft comprising a pair of switches; a first cam means operable by one shaft and operative to hold one of said switches open during a portion of each revolution of said first cam means; a second cam means operable by the other shaft and operative to hold the other of said switches closed during a portion of each revolution of said second cam means; said switches being connected in series circuit relation and one of said switches normally being open during the period when the other switch normally is closed; both of said switches being closed upon a change in speed of the driven shaft relative to the speed of the reference shaft; impedance means connected in the circuit of the motor driving the driven shaft; gear means operatively associated with said impedance means; a gear operable by the driven shaft and having teeth over less than half its circumference; an element having a pair of teeth selectively engageable with the teeth on said gear and a tooth selectively engageable with said gear means; solenoid means connected in series with said switches and effective to engage said element with said gear means and gear to vary the power supply to such motor inversely relative to such change of speed; and switch means operable by said element to insert all of said impedance means in the circuit of such motor upon an increase in speed of the driven shaft relative to that of the reference shaft.

12. A synchronizing system for maintaining a constant ratio between the speeds of rotation of a reference shaft and an electric motor driven shaft comprising a pair of switches; a first cam means operable by one shaft and operative to hold one of said switches open during a portion of each revolution of said first cam means; a second cam means operable by the other shaft and operative to hold the other of said switches closed during a portion of each revolution of said second cam means; said switches being connected in series circuit relation and one of said switches normally being open during the period when the other switch normally is closed; both of said switches being closed upon a change in speed of the driven shaft relative to the speed of the reference shaft; impedance means connected in the circuit of the motor driving the driven shaft; gear means operatively associated with said impedance means; a gear operable by the driven shaft and having teeth over less than half its circumference; an element having a pair of teeth selectively engageable with the teeth on said gear and a tooth selectively engageable with said gear means; solenoid means connected in series with said switches and effective to engage said element with said gear means and gear to vary the power supply of such motor inversely relative to such change of speed; switch means operable by said element to insert all of said impedance means in the circuit of such motor upon an increase in speed of the driven shaft relative to that of the reference shaft; and switch means operable by said element to short circuit said impedance means upon a decrease in speed of the driven shaft relative to that of the reference shaft.

13. A synchronizing system for maintaining a constant ratio between the speeds of rotation of a reference shaft and a driven shaft comprising a pair of switches; a first cam means operable by one shaft and operative to hold one of said switches open during a portion of each revolution of said first cam means; a second cam means operable by the other shaft and operative to hold the other of said switches closed during a portion of each revolution of said second cam means; said switches being connected in series circuit relation and one of said switches normally being open during the period when the other switch normally is closed; both of said switches being closed upon a change in speed of the driven shaft relative to the speed of the reference shaft; a disk operatively associated with the driven shaft; a brake adapted to engage said disk; a cam controlling the pressure of said brake against said disk; gear means operatively associated with said cam; a gear operable by the driven shaft and having teeth over less than half its circumference; an element having a pair of teeth selectively engageable with the teeth on said gear and a tooth selectively engageable with said gear means; solenoid means connected in series with said switches and effective to engage said element with said gear means and gear to operate said cam to vary the pressure of said brake against said disk in accordance with such change of speed; a pair of spaced projections on said element; flexible means supporting said brake, said flexible means having an ear extending between said spaced projections whereby, upon movement of said element in one direction upon an increase in the speed of the driven shaft, said projections engage said ear to move said flexible means to momentarily greatly increase the pressure of said brake against said disk and, upon movement of said element in the opposite direction upon a decrease in the relative speed of the driven shaft, said projections engage said ear to move said flexible means to momentarily greatly decrease the pressure of said brake against said disk.

14. A synchronizing system for maintaining a constant ratio between the speeds of rotation of a reference shaft and an electric motor driven shaft comprising a pair of cooperating switching mechanisms each operable by one of the shafts, said switching mechanisms being connected in series circuit relation and one of said switching mechanisms normally being open during the period when the other switching mechanism normally is closed; both of said switching mechanisms being closed upon a change in speed of the driven shaft relative to the speed of the reference shaft; an adjustable impedance connected in series with the motor driving the driven shaft; a first gear means operatively associated with said adjustable impedance; a second gear means operable by the driven shaft; and solenoid means connected in series with said switching mechanisms and effective to interconnect said first and second gear means to operate said impedance to vary the power supply to the motor inversely relative to such change of speed.

15. A synchronizing system for maintaining a constant ratio between the speeds of rotation of a reference shaft and a driven shaft comprising a pair of switches; a first cam means operable by one shaft and operative to hold one of said switches open during a portion of each revolution of said first cam means; a second cam means operable by the other shaft and operative to hold the other of said switches closed during a portion of each revolution of said second cam means; said switches being connected in series circuit relation and one of said switches normally being open during the period when the other switch normally is closed; both of said switches being closed upon a change in speed of the driven shaft relative to the speed of the reference shaft; a disk operatively associated with said driven shaft; a brake normally engaging said disk; a cam controlling the pressure of said brake against said disk; a first gear means operatively associated with such cam; a second gear means operable by said driven shaft; and electrically operable means connected in series with said switches and effective to interconnect said gear means to operate said cam to vary the pressure of said brake against said disk in accordance with such change of speed.

HENRY H. BRUDERLIN.